United States Patent
Zhang et al.

(10) Patent No.: US 7,972,121 B2
(45) Date of Patent: Jul. 5, 2011

(54) LIMITED FREE-MOTION PUMP IMPELLER COUPLING DEVICE

(75) Inventors: Guohua Zhang, Shenzhen (CN); Lai King Ho, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 950 days.

(21) Appl. No.: 11/905,127

(22) Filed: Sep. 27, 2007

(65) Prior Publication Data

US 2008/0080987 A1  Apr. 3, 2008

(30) Foreign Application Priority Data

Sep. 29, 2006  (CN) .......................... 2006 1 0168949

(51) Int. Cl.
*F04B 35/00*  (2006.01)
(52) U.S. Cl. ...................... 417/319; 417/423.6; 464/161
(58) Field of Classification Search ................. 417/319, 417/423.6; 415/123; 416/169 R; 464/160, 464/161

See application file for complete search history.

(56) References Cited

U.S. PATENT DOCUMENTS

| 4,661,085 | A | * | 4/1987 | Carli | ............................. | 464/160 |
| 4,997,346 | A | * | 3/1991 | Bohon | .......................... | 417/319 |
| 6,007,308 | A | * | 12/1999 | Ko | ............................... | 417/319 |
| 6,384,508 | B1 | | 5/2002 | Marioni et al. | | |
| 2005/0023911 | A1 | | 2/2005 | Marioni | | |

FOREIGN PATENT DOCUMENTS

| DE | 1453728 A1 | 5/1969 |
| DE | 9313843.1 U1 | 7/1994 |
| EP | 0216556 A2 | 4/1987 |
| EP | 0889573 A3 | 1/1999 |
| FR | 1.134.678 A | 4/1957 |
| GB | 1296467 A | 11/1972 |
| WO | WO-94/21026 A1 | 9/1994 |

* cited by examiner

*Primary Examiner* — Charles G Freay
*Assistant Examiner* — Patrick Hamo
(74) *Attorney, Agent, or Firm* — Birch, Stewart, Kolasch & Birch, LLP

(57) ABSTRACT

A limited free-motion coupling device 10 coupling an impeller 14 to a shaft 16 of a rotor 12, the coupling device 10 comprising first and second parts 20, 22 which are axially engaged for relative angular displacement about a rotational axis A, and two spherical coupling members 24 for engaging the first and second parts 20, 22 to prevent the relative angular displacement. One of the first and second parts 20, 22 is provided on the shaft 16 of the rotor 12, and the other is provided on the impeller 14. The first part 20 comprises two spaced coupling member arms 30 which project radially. The second part 22 comprises a cylindrical wall 66 extending coaxially with the rotational axis A of the coupling device 10. Two spaced arcuate channels 50 are formed in the cylindrical wall 66. Each coupling member 24 is received in and projects radially from a respective arcuate channel 50, and is freely movable between end walls of the arcuate channel 50. As the first part 20, rotates relative to the second part 22, the coupling member arms 30 of the first part 20 engage and move the coupling members 24 along the respective arcuate channels 50 until the coupling members 24 abut the end walls of the arcuate channels 50, thus locking the first part 20 relative to the second part 22.

18 Claims, 4 Drawing Sheets

LIMITED FREE-MOTION PUMP IMPELLER COUPLING DEVICE

CROSS-REFERENCE TO RELATED APPLICATIONS

This non-provisional patent application claims priority under 35 U.S.C. §119(a) from Patent Application No. 200610168949.8 filed in China on 29 Sep. 2006.

FIELD OF THE INVENTION

This invention relates to a limited free-motion coupling device coupling an impeller to a shaft of a rotor of a pump motor and to a pump motor incorporating the coupling device.

BACKGROUND OF THE INVENTION

It is known from EP0889573A1 to provide a limited free-motion coupling for a pump impeller which utilises two confronted surfaces extending laterally to the rotational axis of the rotor shaft. One surface is provided on the rotor shaft, and the other surface is provided on the impeller. Each surface includes arcuate channels formed therein. Ball bearings are provided in and project axially from the arcuate channels. When the rotor shaft rotates, the associated lateral surface rotates and the ball bearings are moved to the ends of the arcuate channels, causing the two surfaces to lock relative to each other. Consequently, following an initial angular displacement of the rotor shaft relative to the impeller, the rotor shaft and impeller become engaged, and the impeller rotates.

For a motor with low or limited start-up torque, this initial unloaded free-movement allows the angular velocity of the rotor shaft to increase prior to the motor being put under load from the impeller.

A significant problem that has been identified with the known arrangement is that the provision of arcuate channels in the lateral surfaces results in the impartation of moments through the ball bearings and perpendicularly to the rotational axis, tending to cause the ball bearings to ride up and even out of the arcuate channels. This results in axial separation of the surfaces. Axial separation of the surfaces leads to potential contamination within the coupling device by the ingress of external liquid and/or particulate matter, and once the ball bearings ride fully out of the channels, torque can no longer be transmitted to the impeller and the pump must be replaced.

Obvious modifications to the known design were investigated. Reinforcement of the axial engagement of the impeller and the rotor shaft, in an effort to retain the two confronted lateral surfaces in close proximal relationship, was researched. However, this increased manufacturing costs and was only partially successful since, over time, the ball bearings tended to wear the ends of the channels.

Increasing the angles of the end walls of the channels to be parallel with the rotational axis of the coupling device was also researched. However, again, it is the edges of the end walls of the channels which contact the ball bearings and through which the force is transmitted during lock-up. Over time, the edges of the channels wear, promoting displacement or roll-out of the ball bearings.

Consequently, following a significant amount of research and development, the present invention seeks to provide a solution to this problem.

SUMMARY OF THE INVENTION

According to the present invention, there is provided a limited free-motion coupling device coupling an impeller to a shaft of a rotor, the coupling device comprising first and second parts which are axially engaged for relative angular displacement about a rotational axis, and two spherical coupling members for engaging the first and second parts to prevent the said relative angular displacement, one of the first and second parts being provided on the shaft of the rotor, and the other of the first and second parts being provided on the impeller, the first part comprising two spaced coupling member arms which extend in the axial direction of the coupling device and which project radially, the second part comprising a cylindrical wall extending coaxially with the rotational axis of the coupling device, and two spaced arcuate channels which are formed in the cylindrical wall, each said coupling member being received in and projecting radially from a respective said arcuate channel and being freely movable between ends of the arcuate channel, so that, as one of the first and second parts rotates relative to the other of the first and second parts, the coupling member arms of the first part engage and move the coupling members along the respective arcuate channels until the coupling members abut the ends of the arcuate channels, thus locking the first and second parts relative to each other.

Preferably, the coupling member arms project radially outwardly so that a radially outermost edge of each arm extends in parallel with the rotational axis of the coupling device.

Preferably, the first part includes a base element which supports the coupling members, and a boss which extends from the base element and coaxially with the rotational axis of the coupling device and which prevents or limits radially inwards movement of the coupling members, the coupling member arms extending from the base element, and along and radially outwards from the boss.

Preferably, the coupling member arms extend partway towards the peripheral edge of the base element.

Preferably, the second part includes a cavity in which the first part and the coupling members are received, the cavity including a first surface extending laterally to the rotational axis of the coupling device, and the cylindrical wall extending from the first surface.

Preferably, the coupling members project radially inwardly from the arcuate channels.

Preferably, the longitudinal extents of the arcuate channels are in the same plane.

Preferably, the coupling member arms project radially inwardly so that a radially innermost edge of each arm extends in parallel with the rotational axis of the coupling device.

Preferably, the first part includes a cavity in which the second part and the coupling members are received, the coupling member arms extending radially inwardly into the cavity.

Preferably, the second part includes a base element which includes a coupling member bearing surface, and a boss which extends from the base element and coaxially with the rotational axis of the coupling device and which prevents or limits radially inwards movement of the coupling members, the boss including the cylindrical wall and the two spaced arcuate channels.

Preferably, the first part is provided on the rotor shaft, and the second part is provided on the impeller.

Alternatively, the first part is provided on the impeller, and the second part is provided on the rotor shaft.

According to a second aspect, the present invention provides a pump assembly, comprising a synchronous motor having a wound stator and a permanent magnet rotor including a shaft, and an impeller connected to the shaft and driven thereby via a coupling device allowing limited free-motion, wherein the coupling device comprising first and second parts which are axially engaged for relative angular displacement about a rotational axis, and two spherical coupling members for engaging the first and second parts to prevent the said relative angular displacement, one of the first and second parts being provided on the shaft of the rotor, and the other of the first and second parts being provided on the impeller, characterised by: the first part comprising two spaced coupling member arms which extend in the axial direction of the coupling device and which project radially, the second part comprising a cylindrical wall extending coaxially with the rotational axis of the coupling device, and two spaced arcuate channels which are formed in the cylindrical wall, each said coupling member being received in and projecting radially from a respective said arcuate channel and being freely movable between ends of the arcuate channel, so that, as one of the first and second parts rotates relative to the other of the first and second parts, the coupling member arms of the first part engage and move the coupling members along the respective arcuate channels until the coupling members abut the ends of the arcuate channels, thus locking the first and second parts relative to each other.

BRIEF DESCRIPTION OF THE DRAWINGS

The present invention will now be more particularly described, by way of example only, with reference to the accompanying drawings, in which.

DETAILED DESCRIPTION OF THE PREFERRED EMBODIMENT

Figure 1:
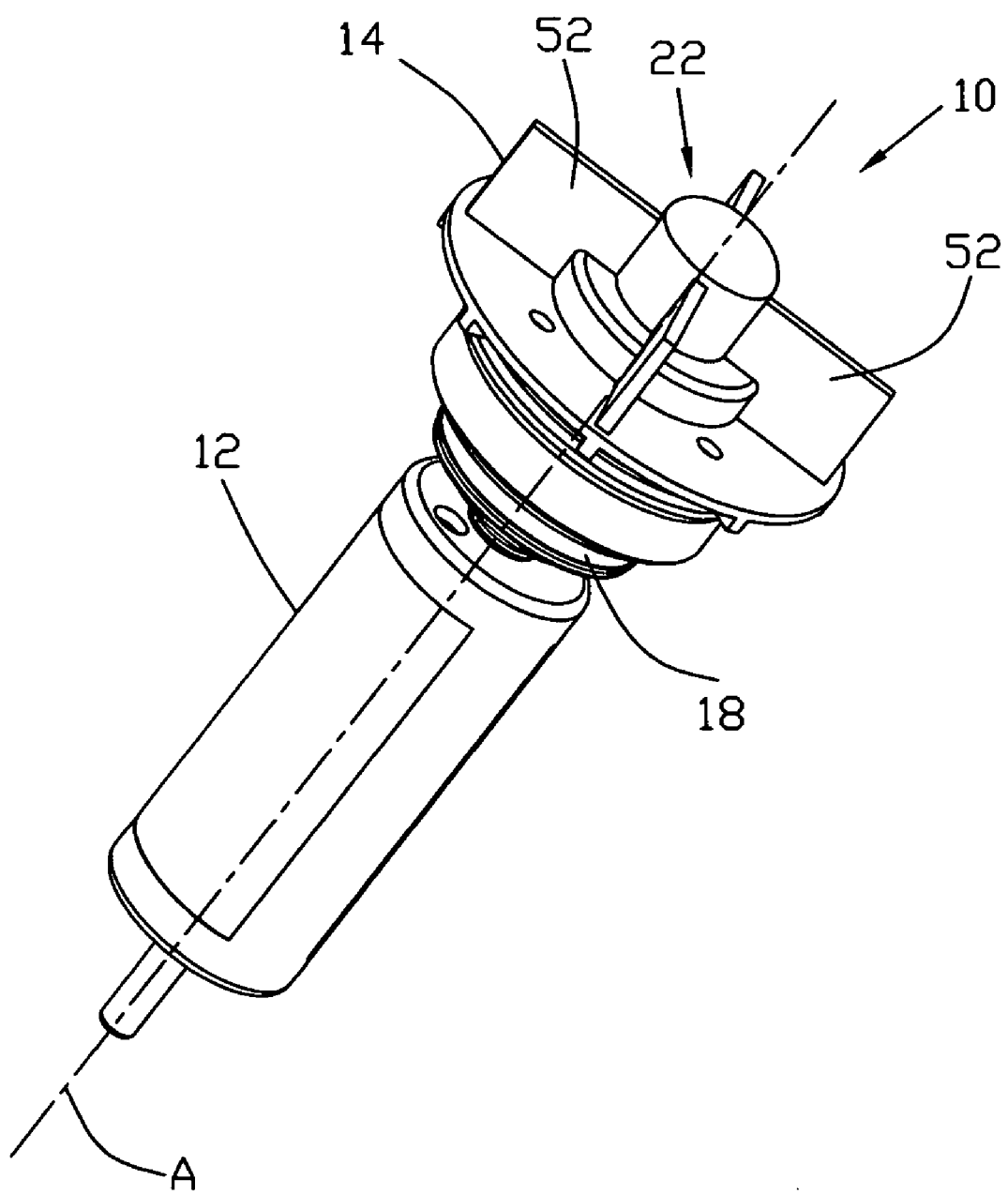
FIG. 1 shows a perspective view of one embodiment of a coupling device, in accordance with the present invention and coupling a rotor and impeller of a pump assembly.
Figure 2:
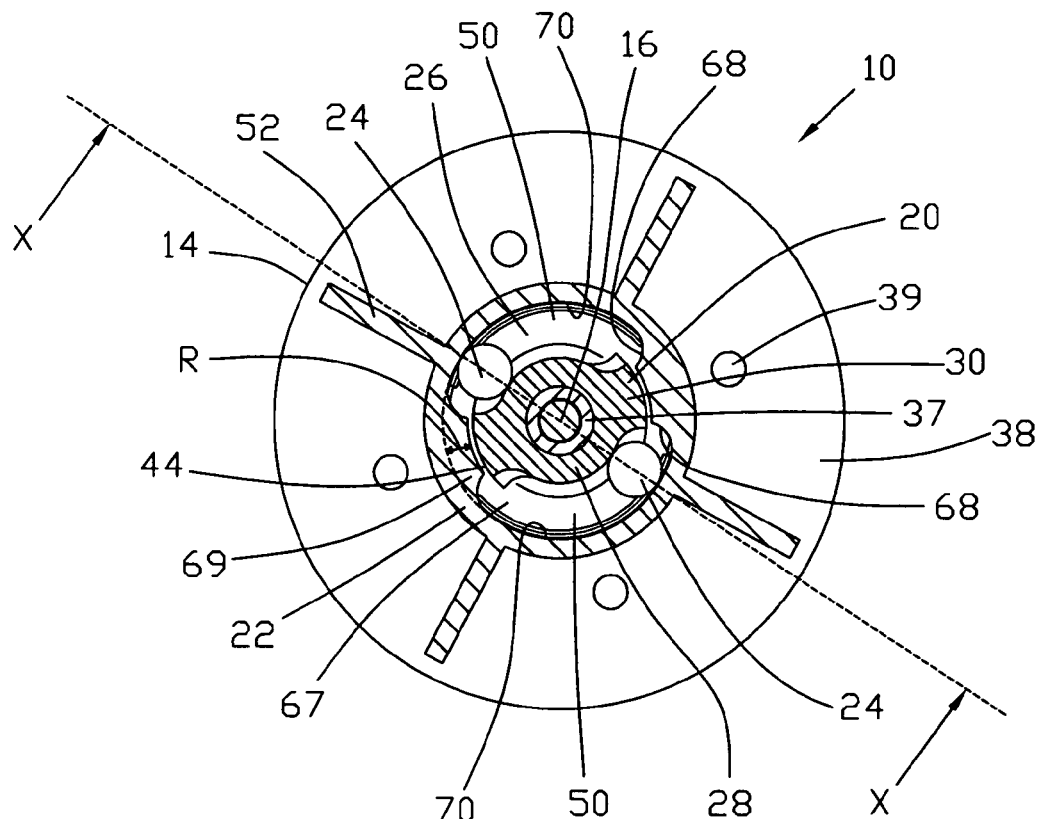
FIG. 2 is a cross-sectional plan view of the coupling device, taken laterally to the rotational axis of the rotor shaft and through the impeller.

Referring now to the drawings, there is shown a limited free-motion coupling device 10, which can also be referred to as a lost-motion coupling device.

Figure 3:
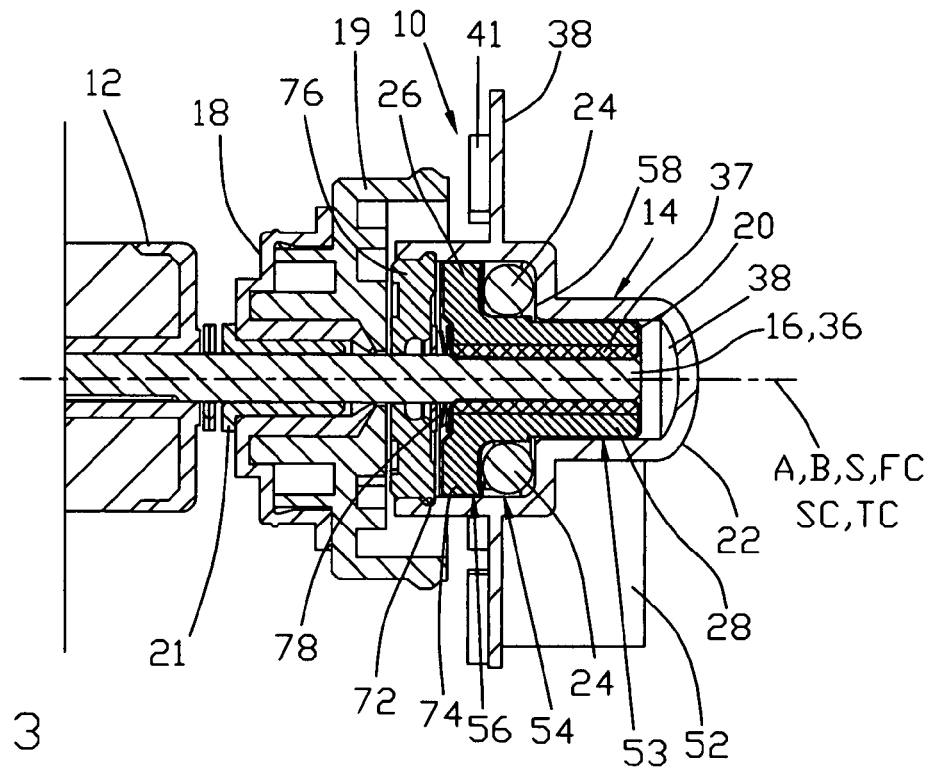
FIG. 3 is a cross-sectional view of the coupling device, as viewed along section line X-X of FIG. 2.
Figure 4:
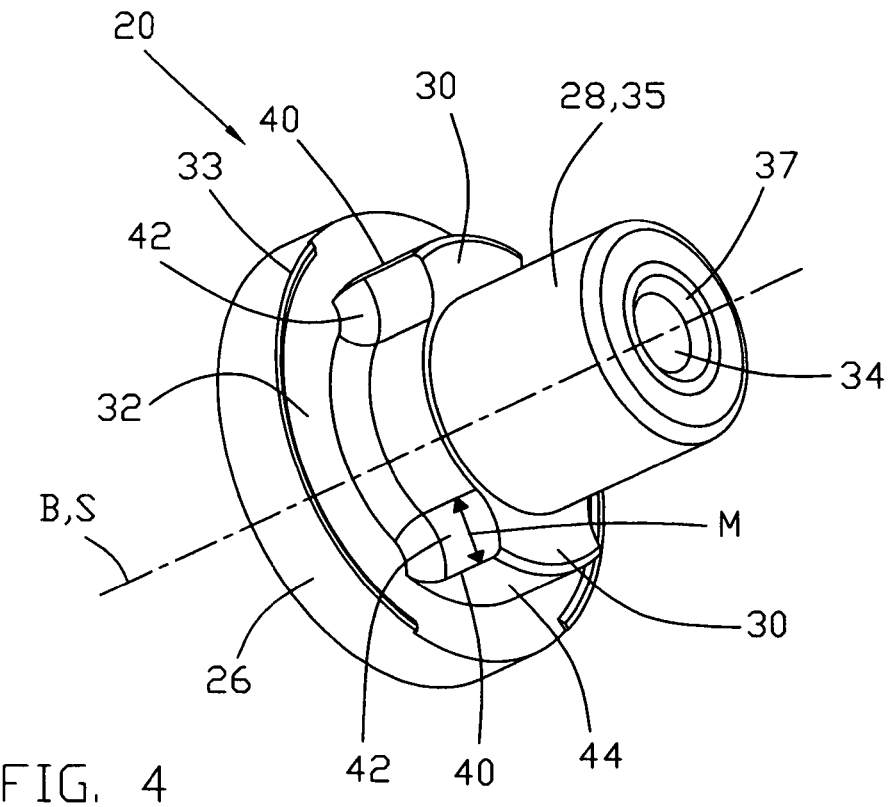
FIG. 4 is a perspective view of a first part of the coupling device.
Figure 5:
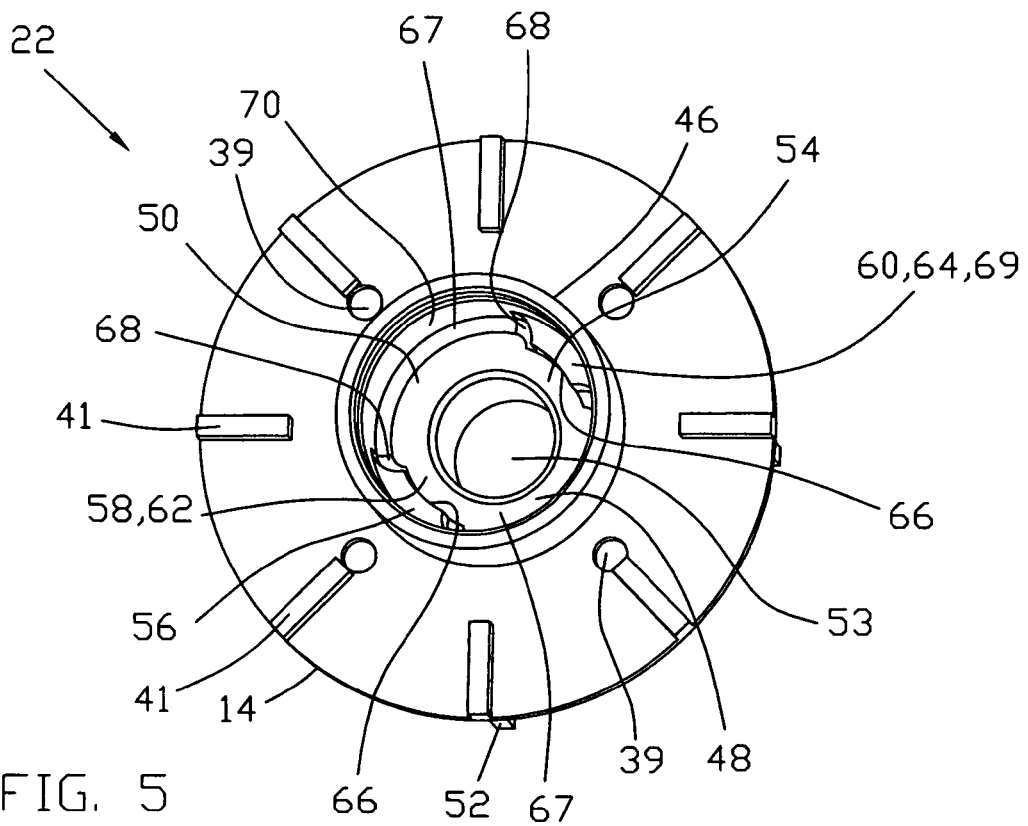
FIG. 5 is a perspective view from below of a second part of the coupling device, formed as part of the impeller.
Figure 6:
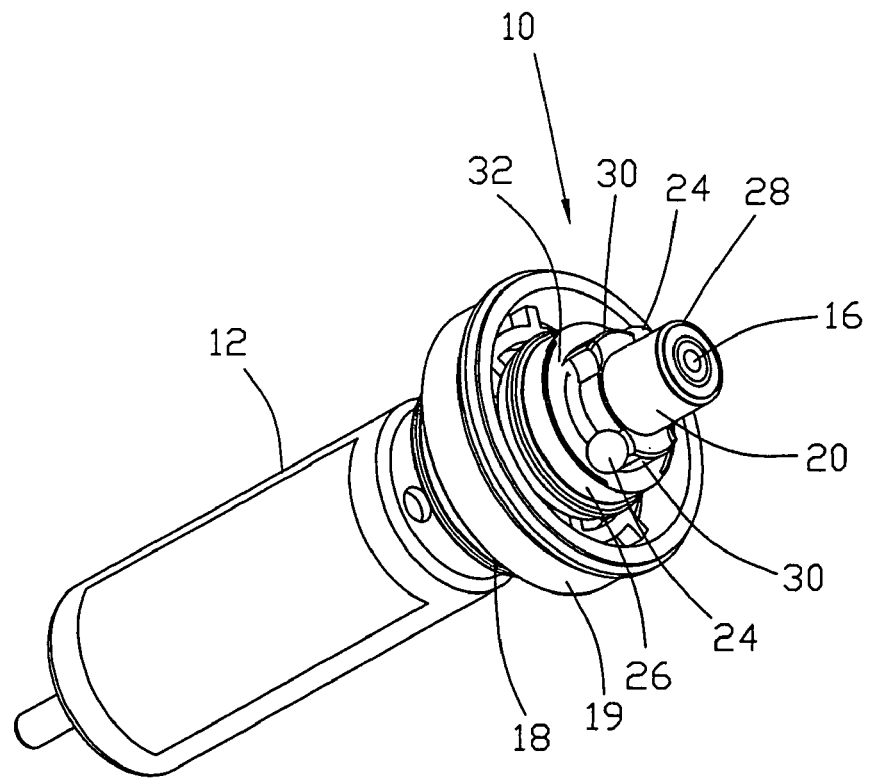
FIG. 6 is a perspective view of the coupling device with the second part of the coupling device and impeller removed.

The coupling device 10 shown forms part of a pump assembly for a washing machine. The pump assembly comprises a two-pole permanent magnet rotor 12 and an impeller 14. The coupling device 10 couples a shaft 16 of the rotor 12 and the impeller 14. An elastomeric seal 18, typically rubber ring, gasket, or boot, and a bracket 19 for supporting a bearing 21 of the rotor 12 and the seal 18, are also included. The rotor shaft 16 projects through the seal 18 and bracket 19. The seal 18 acts as a seal for a chamber of the rotor 12 and protects bearing grease provided therein. As this pump assembly is for use in a washing machine, and the water in which the pump assembly is immersed is therefore not clean. Particulate matter in the water can cause a physical interference with the free movement of the rotor, and thus the seal 18 is necessary. The preferred seal is in the form of a boot which seals directly between the shaft and the rotor chamber. The preferred boot, as shown in FIG. 3, also provides an elastic mount for the bearing 21 by passing between the bearing and the bracket thereby giving the bearing some freedom to align with the shaft under the resilient urgings of the material of the boot to accommodate slight misalignment of the shaft and/or bearing. Bearing 21 is preferably a bushing, as shown.

The coupling device 10 comprises a, typically plastics moulded, first part 20, a, typically plastics moulded, second part 22 in which the first part 20 is received for limited relative angular displacement about a rotational axis A of the rotor 12, and two identical, typically stainless steel, spherical coupling members 24, preferably in the form of ball bearings.

The first part 20 comprises a cylindrical base element 26 having a first diameter, a cylindrical boss 28 which is integrally formed to project from one surface of the base element 26, and two coupling member arms 30.

The cylindrical boss 28 has a second diameter which is smaller than the first diameter of the base element 26, thus providing a first coupling member bearing surface 32 on the base element 26, around and adjacent to the boss 28.

Cylindrical axes B, S of the base element 26 and the boss 28 are coaxial, and a rotor shaft opening 34 is formed as a hole through the first part 20, and along the cylindrical axis S of the boss 28. The rotor shaft opening 34 is dimensioned to accept the rotor shaft 16 of the rotor 12 assembly. Typically, an end portion 36 of the rotor shaft 16 engages a metal, typically copper, tube or sleeve 37 moulded into the rotor shaft opening 34 in the first part 20. Sleeve 37 is an interference press-fit on the end-portion 36 of the shaft 16.

Although, as an alternative, the rotor shaft can be keyed to or splined in the rotor shaft opening, with or without the interposed sleeve, any other suitable means for engaging the first part 20 to the rotor shaft 16 can be utilised, providing the first part 20 is held stationary relative to the rotor shaft 16. For example, the end portion of the rotor shaft and the rotor shaft opening can be complementarily non-circularly shaped.

It is also envisaged that the first part 20 can be integrally formed as part of the rotor shaft 16, for example, by moulding or casting.

The coupling member arms 30 are provided diametrically opposite each other. The arms 30 are integrally formed to extend partway along the cylindrical outer wall 35 of the boss 28 from the base element 26, and radially outwardly from the boss 28 and partway across the first coupling member bearing surface 32. A radially outermost edge 40 of each arm 30 extends in parallel with the rotational axis A of the coupling device 10.

Each coupling member arm 30 extends a distance along the boss 28 and away from the base element 26 which is approximately equal to the diameter of each coupling member 24. It may be slightly greater or slightly less.

Each coupling member arm 30 also extends radially outwardly across the first coupling member bearing surface 32 a distance which may be equal to but preferably marginally less than the radius of each coupling member 24.

A radially outermost circumferential surface 44 of each coupling member arm 30 is arcuate in a plane which is lateral to the cylindrical axis S of the boss 28, and rectilinear in a plane which is parallel to the cylindrical axis of the boss 28.

The second part 22 of the coupling device 10 forms part of the impeller 14, and comprises a housing 46 defining a stepped cavity 48, and two spaced elongate arcuate channels 50 for receiving the two spherical coupling members 24, respectively. Blades 52 of the impeller 14 are formed on an exterior surface of the housing 46, and project radially outwardly along an integrally formed plate-like radial skirt 38, and beyond the bracket 19. Radial skirt 38 has four through holes 39 equally spaced circumferentially between respective impeller blades 52. The lower face of the radial skirt 38, opposite the impeller blades 52, has eight radial ridges 41 forming scavenger blades which create a lower pressure area in the vicinity of the bearing 21.

The stepped cavity 48 includes a first cylindrical chamber 53 for receiving the boss 28 of the first part 20 as a close rotatable fit, a second cylindrical chamber 54 for receiving the coupling member arms 30 of the first part 20 as a close rotatable fit, and a third cylindrical chamber 56 for receiving the base element 26 of the first part 20, also as a close rotatable fit.

Cylindrical axes FC, SC and TC of the first, second and third chambers 53, 54 and 56 are coaxial.

The first chamber 53 has a diameter which is less than the diameter of the second chamber 54, thereby forming a radially outwardly extending first shoulder 58 between the first and second chambers 53, 54. The second chamber 54 has a diameter which is less than the diameter of the third chamber 56, thereby forming a radially outwardly extending second shoulder or shoulders 60 between the second and third chambers 54, 56.

The first shoulder 58 defines a second coupling member bearing surface 62 which extends laterally to the cylindrical axes FC, SC of the first and second chamber 53, 54.

The second shoulder or shoulders 60 define a base element bearing surface 64 which extends laterally to the cylindrical axis TC of the third chamber 56.

The second chamber 54 has a cylindrical wall 66 which extends coaxially with the rotational axis A of the coupling device 10, and the two arcuate channels 50 are formed diametrically opposite each other in the cylindrical wall 66 to extend the second coupling member bearing surface 62 further radially outwardly. The cylindrical wall 66 is thus recessed radially outwardly at two angularly spaced positions so that each arcuate channel 50 comprises two radially or substantially radially extending end walls 68, and a circumferential wall 70 which extends between the two end walls 68.

The arcuate channels 50 are formed in a plane which extends laterally to the cylindrical axes FC, SC, TC of the first, second and third chamber 53, 54, 56, and have a sufficient longitudinal extent to allow the respective spherical coupling members 24 to freely and independently move therealong.

A radial extent R of each arcuate channel 50, being the depth perpendicular to the cylindrical axis SC of the second chamber 54, is such that each coupling member 24 projects radially inwardly from its respective channel 50. The radial extent R of each arcuate channel 50 which may be equal to but preferably marginally less than the radius of each coupling member 24.

An axial extent of each arcuate channel 50, being the depth parallel to the cylindrical axis SC and perpendicular to the radial extent R, is equal to or slightly greater than the diameter of each coupling member 24.

To assemble the coupling device 10, the first part 20 is initially fitted to the end portion 36 of the rotor shaft 16, as described above. The two spherical coupling members 24 are seated on the first coupling member bearing surface 32, provided on the base element 26 and between the coupling member arms 30. A ridge 33 formed on the outer edge of the first coupling member bearing surface 32, provides a lip to hold the coupling members 24 in place during assembly. Ridge 33 is shown as being formed in two sections but may be a continuous ridge. The first part 20 and the coupling members 24 are then inserted into the cavity 48 of the second part 22, with the boss 28 of the first part 20 being located in the first chamber 53, the coupling member arms 30 and the coupling members 24 being located in the second chamber 54 and arcuate channels 50, respectively, and the base element 26 being located in the third chamber 56.

To retain the first part 20 within the cavity 48 of the second part 22, a groove 72 is provided in the cylindrical wall 74 of the third chamber 56, adjacent to the base element 26 of the first part 20. A cover plate 76 is provided on the rotor shaft 16 adjacent to the base element 26. The cover plate 76 is engaged with the groove 72 of the third chamber 56 as a snap- or push-fit. A spring 78 such as a spring clip or spring washer is interposed between the base element 26 and the cover plate 76 to bias the first part 20 of the coupling device 10 into the cavity 48 of the second part 22. A flat washer 79 is optionally provided as a sliding contact between the spring 78 and the cover plate 76.

The coupling members 24 are thus interposed between the first and second coupling member bearing surfaces 32, 62, which prevents or limits axial movement of the coupling members 24. The coupling members 24 are also interposed between the cylindrical outer wall 35 of the boss 28 and recessed-portions 67 of the cylindrical wall 66 of the second chamber 54, thus preventing or limiting radial movement of the coupling members 24. The recessed portions 67 correspond to the channels 50.

The elongate arcuate channels 50 do allow circumferential movement of the coupling members 24 along the arcuate channels 50, from one end to the other.

A radial extent M of the coupling member arms 30 is fractionally less than the diameter of unrecessed-portions 69 of the second chamber 54 of the housing cavity 48 of the second part 22, so that, if the coupling members 24 were removed, the first and second parts 20, 22 of the coupling device 10 would be freely rotatable by more than 360° relative to each other. In other words, the coupling member arms 30 cannot directly engage the ends of the channels 50 or the cylindrical wall 66 of the second chamber 54 of the housing cavity 48.

In use, since the coupling members 24 project from their respective arcuate channels 50 in a radially inwards direction, as the first part 20 of the coupling device 10 rotates, due to operation of the rotor 12, relative to the impeller 14, the radially extending coupling member arms 30 move into engagement with the spherical coupling members 24. Since each coupling member arm 30 has a radial extent M equal or substantially equal to the radius of its respective coupling member 24, a force applied by the arm 30 to the coupling member 24 when making contact is imparted through or substantially through the centre of the coupling member 24, in a tangential or substantially tangential direction of the arms 24.

As the rotor shaft 16, and thus the first part 20 of the coupling device 10, continues to turn relative to the impeller 14, the arms 30 push the coupling members 24 along the respective arcuate channels 50, until the coupling members 24 abut the end walls 68 of the channels 50, respectively. With the coupling members 24 sandwiched or nipped between the coupling member arms 30 and the end walls 68 of the arcuate channels 50, the force imparted by the arms 30 to the coupling members 24 is transmitted to the second part 22, thus causing the second part 22 to rotate with the first part 20. With the first and second parts 20, 22 of the coupling device 10 thus locked relative to each other, the impeller 14 is caused to rotate with rotation of the rotor shaft 16.

Since the rotor 12 is a two pole permanent magnet arrangement, the rotor can rotate in either direction on start-up.

Consequently, each coupling member 24 can be moved from one end of its arcuate channel 50 to the other before the first and second parts 20, 22 of the coupling device 10 become locked or engaged. As such, the amount of free- or lost-motion available to the rotor 12 can be in excess of 180°, thus allowing the rotor more than 180° of start-up rotation before the load of the impeller 14 is applied.

The range of free-motion is typically chosen depending on the application and material strength. A higher load may preferably require a larger range of free movement, but this tends to put more stress on the arms and the ends of the channels. However, larger coupling member arms and shorter channels give greater strength, but the free movement is less and thus requires greater torque to move a given load.

A typical range of free movement allowed by the coupling device 10 is 90 degrees to 270 degrees.

An angular spacing between radial surfaces 42 of each coupling member arm 30 is less than 180°, and is typically in the range of 5 degrees to 95 degrees.

The arc described by each arcuate channel 50, between its respective end walls 68, is less than 180°, and is typically in the range of 5 degrees to 110 degrees.

The angles described by the coupling member arms and the arcuate channels can be the same or different, depending upon necessity.

Figure 7:
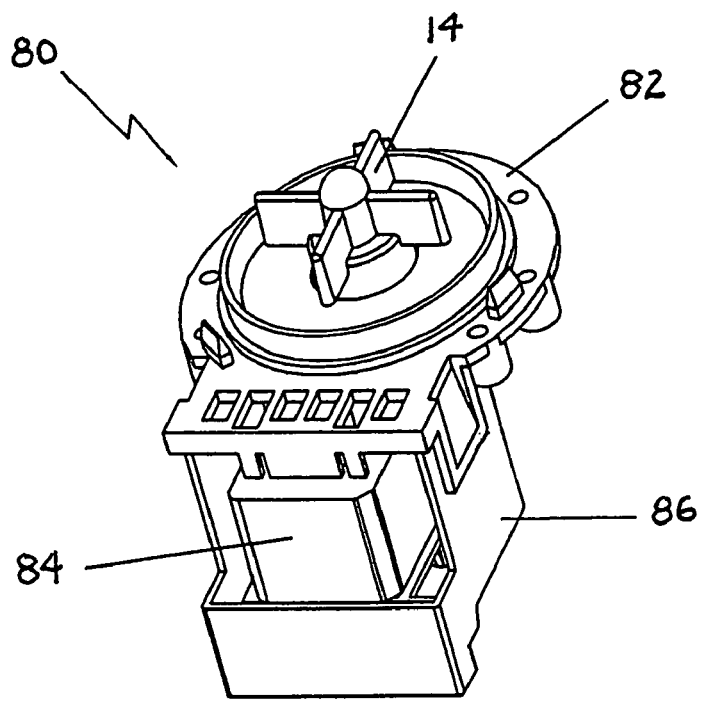
FIG. 7 is a perspective view of a pump assembly for a washing machine according to an embodiment of the present invention.

FIG. 7 illustrates a pump assembly incorporating a coupling device according to the present invention. The motor 80 has a rotor driving an impeller 14 through the coupling device as hereinbefore described. In this illustration, the impeller does not have a radial skirt. The pump motor has a flange 82 to which a pump volute is fitted to form or complete the pump chamber in which the impeller resides. A stator 84, formed by a stack of steel laminations and a stator core (not visible) provides the driving force for the rotor. A motor housing 86 completes the motor shell of the pump motor.

It will be readily apparent that obvious modifications can be made to the above-described embodiment, while still achieving the same result. For example, the first part as described can be provided on the impeller side of the pump, either forming part of the impeller or attached to the impeller, and the second part can be provided on the rotor shaft.

Furthermore, the arcuate channels can be provided in the cylindrical wall of the boss, and the coupling member arms can be provided in the cavity, projecting radially inwards from the cylindrical wall of the second chamber. In this case, the first part of the coupling device comprises the housing having the cavity with the coupling member arms, and the second part comprises the base element, boss, and arcuate channels.

Providing two diametrically opposing coupling member arms, two diametrically opposing arcuate channels, and two identical spherical coupling members allows the rotor and impeller assembly to remain balanced during use. This is extremely important in order to prevent the generation and/or impartation of asymmetrical forces in the pump assembly. Asymmetrical forces tend to lead to increased wear, reduced reliability, and a reduction in operational life.

However, it will be appreciated that more than two coupling member arms, arcuate channels and coupling members can be provided.

In an alternative arrangement to axially engage the first part of the coupling device with the rotor shaft, a distal end of the rotor shaft can be formed with an internally extending axial screw-thread, and a screw-threaded cap element can be threadingly engaged therewith, whereby the cap element overlaps the end of the boss remote from the base element.

It is also envisaged that the first part can be integrally formed as part of the rotor shaft, for example, by moulding or casting.

It is thus possible to provide a limited free-movement coupling device which, if moments are imparted to the coupling members, the moments occur about an axis which is in parallel with the rotational axis of the rotor shaft and impeller, rather than perpendicularly to the rotational axis. Consequently, any undesirable forces imparted by the coupling members to the first and second parts will be radial, and not axial as with the prior art. It is highly unlikely that radial deformation of the first and second parts will occur, and thus, even following wear of the ends of the channels, there is little prospect of the coupling members riding out of the arcuate channels.

The provision of the arcuate channels in an axially parallel wall enables the coupling members to project radially, instead of axially, from the channels. The coupling member arms are also conveniently spaced radially from the arcuate channels, either radially inwardly or radially outwardly.

The coupling members themselves act to cushion the impact of engagement with the ends of the channels, thus reducing wear and noise when compared to direct engagement between the coupling member arms and the ends of the channels.

The boss is any suitable projection, and can be, for example, a spigot.

The embodiments described above are given by way of examples only, and various other modifications will be apparent to persons skilled in the art without departing from the scope of the invention, as defined by the appended claims. For example, although the pump assembly is described as being suitable for a washing machine, numerous other applications will be readily and obviously apparent to the skilled person, and consequently various non-essential parts, such as the seal, may be dispensed with.

We claim:

1. A limited free-motion coupling device coupling an impeller to a shaft of a rotor, the coupling device comprising a first part and a second part which are axially engaged for relative angular displacement about a rotational axis, and two spherical coupling members for engaging the first and second parts to prevent the said relative angular displacement, one of the first and second parts being provided on the shaft of the rotor, and the other of the first and second parts being provided on the impeller, the first part comprising two spaced coupling member arms which extend in the axial direction of the coupling device and which project radially, the second part comprising a cylindrical wall extending coaxially with the rotational axis of the coupling device, and two spaced arcuate channels which are formed in the cylindrical wall, each said coupling member being received in and projecting radially from a respective said arcuate channel and being freely movable between ends of the arcuate channel, so that, as one of the first and second parts rotates relative to the other of the first and second parts, the coupling member arms of the first part engage and move the coupling members along the respective arcuate channels until the coupling members abut the ends of the arcuate channels, thus locking the first and second parts relative to each other.

2. The limited free-motion coupling device of in claim 1, wherein the coupling member arms project radially outwardly so that a radially outermost edge of each arm extends in parallel with the rotational axis of the coupling device.

3. The limited free-motion coupling device of claim 2, wherein the first part includes a base element which supports the coupling members, and a boss which extends from the base element and coaxially with the rotational axis of the coupling device and which prevents or limits radially inwards movement of the coupling members, the coupling member arms extending from the base element, and along and radially outwards from the boss.

4. The limited free-motion coupling member device of claim 3, wherein the coupling member arms extend partway towards the peripheral edge of the base element.

5. The limited free-motion coupling device of claim 1, wherein the second part includes a cavity in which the first part and the coupling members are received, the cavity including a first shoulder extending laterally to the rotational axis of the coupling device, and the cylindrical wall extending from the first shoulder.

6. The limited free-motion coupling device of claim 1, wherein the coupling members project radially inwardly from the arcuate channels.

7. The limited free-motion coupling device of claim 1, wherein the longitudinal extents of the arcuate channels are in the same plane.

8. The limited free-motion coupling device of claim 1, wherein the first part is provided on the rotor shaft, and the second part is provided on the impeller.

9. The limited free-motion coupling device of claim 1, wherein the first part is provided on the impeller, and the second part is provided on the rotor shaft.

10. A pump assembly, comprising a synchronous motor having a wound stator and a permanent magnet rotor including a shaft, and an impeller connected to the shaft and driven thereby via a coupling device allowing limited free-motion, wherein the coupling device comprises: a first part and a second part which are axially engaged for relative angular displacement about a rotational axis, and two spherical coupling members for engaging the first and second parts to prevent the said relative angular displacement, one of the first and second parts being provided on the shaft of the rotor, and the other of the first and second parts being provided on the impeller, the first part comprising two spaced coupling member arms which extend in the axial direction of the coupling device and which project radially, the second part comprising a cylindrical wall extending coaxially with the rotational axis of the coupling device, and two spaced arcuate channels which are formed in the cylindrical wall, each said coupling member being received in and projecting radially from a respective said arcuate channel and being freely movable between end walls of the arcuate channel, so that, as the first part rotates relative to the second part, the coupling member arms of the first part engage and move the coupling members along the respective arcuate channels until the coupling members abut the end walls of the arcuate channels, thus locking the first and second parts relative to each other.

11. The pump assembly of claim 10, wherein the coupling member arms project radially outwardly so that a radially outermost edge of each arm extends in parallel with the rotational axis of the coupling device.

12. The pump assembly of claim 10, wherein the first part includes a base element which supports the coupling members, and a boss which extends from the base element and coaxially with the rotational axis of the coupling device and which prevents or limits radially inwards movement of the coupling members, the coupling member arms extending from the base element, and along and radially outwards from the boss.

13. The pump assembly of claim 10, wherein the coupling member arms extend partway towards the peripheral edge of the base element.

14. The pump assembly of claim 10, wherein the second part includes a cavity in which the first part and the coupling members are received, the cavity including a first shoulder extending laterally to the rotational axis of the coupling device, and the cylindrical wall extending from the first shoulder.

15. The pump assembly of claim 10, wherein the coupling members project radially inwardly from the arcuate channels.

16. The pump assembly of claim 10, wherein the longitudinal extents of the arcuate channels are in the same plane.

17. The pump assembly of claim 10, wherein the first part is provided on the rotor shaft, and the second part is provided on the impeller.

18. The pump assembly of claim 10, wherein the first part is provided on the impeller, and the second part is provided on the rotor shaft.

* * * * *